(12) United States Patent
Nguyen et al.

(10) Patent No.: US 12,051,996 B2
(45) Date of Patent: Jul. 30, 2024

(54) SENSING ROOFING SYSTEM AND METHOD THEREOF

(71) Applicant: GAF Energy LLC, Parsippany, NJ (US)

(72) Inventors: Thierry Nguyen, San Francisco, CA (US); Igor Alovert, Morristown, NJ (US); Richard Perkins, San Jose, CA (US); Gabriela Bunea, San Jose, CA (US); Angelo Bossini, Parsippany, NJ (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/463,074

(22) Filed: Sep. 7, 2023

(65) Prior Publication Data
US 2024/0088832 A1  Mar. 14, 2024

Related U.S. Application Data

(60) Provisional application No. 63/406,104, filed on Sep. 13, 2022.

(51) Int. Cl.
*H02S 50/00* (2014.01)
*G01D 11/30* (2006.01)
(Continued)

(52) U.S. Cl.
CPC .............. *H02S 50/00* (2013.01); *G01D 11/30* (2013.01); *H02S 20/25* (2014.12);
(Continued)

(58) Field of Classification Search
CPC .......... H02S 50/00; H02S 20/25; H02S 20/24; H02S 20/23; G01D 11/30; B32B 2419/06;
(Continued)

(56) References Cited

U.S. PATENT DOCUMENTS 1,981,467 A   11/1934   Radtke
3,156,497 A   11/1964   Lessard
(Continued)

FOREIGN PATENT DOCUMENTS

CA    2829440 A    5/2019
CH    700095 A2   6/2010
(Continued)

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles>> retrieved Feb. 2, 2021.
(Continued)

*Primary Examiner* — Michael Y Sun
(74) *Attorney, Agent, or Firm* — GREENBERG TRAURIG, LLP

(57) ABSTRACT

A method including: obtaining a flexible underlayment, wherein the flexible underlayment comprises: a first sensor, wherein the first sensor comprises a first flexible circuit, and wherein the first flexible circuit is configured to: measure a first value representative of a first roofing system condition measurement, wherein the first flexible circuit measures the first value at a first location, wherein a first location identifier indicative of the first location is stored in a database in communication with the first sensor; determine a first roofing system condition in the first location based at least in part on the first value and the first location identifier; and generate a first notification representative of the first roofing system condition; installing the flexible underlayment on a roof deck of a steep slope roof of a structure; installing a first roofing shingle over the flexible underlayment and above at least the first sensor.

13 Claims, 2 Drawing Sheets

(51) Int. Cl.
| | |
|---|---|
| *H02S 20/25* | (2014.01) |
| *E04D 3/40* | (2006.01) |
| *E04D 12/00* | (2006.01) |
| *G08B 21/04* | (2006.01) |
| *G08B 25/01* | (2006.01) |
| *H02S 20/24* | (2014.01) |

(52) U.S. Cl.
CPC ............ *B32B 2419/06* (2013.01); *E04D 3/40* (2013.01); *E04D 12/002* (2013.01); *G08B 21/0438* (2013.01); *G08B 25/018* (2013.01); *H02S 20/24* (2014.12)

(58) Field of Classification Search
CPC ..... E04D 3/40; E04D 12/002; G08B 21/0438; G08B 25/018
See application file for complete search history.

(56) References Cited

U.S. PATENT DOCUMENTS

| | | | |
|---|---|---|---|
| 3,581,779 | A * | 6/1971 | Sylvia, Jr. ................ E04D 5/10 |
| | | | 52/309.3 |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |
| 5,167,579 | A | 12/1992 | Rotter |
| 5,437,735 | A | 8/1995 | Younan et al. |
| 5,590,495 | A | 1/1997 | Bressler et al. |
| 5,642,596 | A | 7/1997 | Waddington |
| 6,008,450 | A | 12/1999 | Ohtsuka et al. |
| 6,033,270 | A | 3/2000 | Stuart |
| 6,046,399 | A | 4/2000 | Kapner |
| 6,201,180 | B1 | 3/2001 | Meyer et al. |
| 6,220,329 | B1 | 4/2001 | King et al. |
| 6,308,482 | B1 * | 10/2001 | Strait ....................... D06N 5/00 |
| | | | 428/57 |
| 6,320,114 | B1 | 11/2001 | Kuechler |
| 6,320,115 | B1 | 11/2001 | Kataoka et al. |
| 6,336,304 | B1 | 1/2002 | Mimura et al. |
| 6,341,454 | B1 | 1/2002 | Koleoglou |
| 6,407,329 | B1 | 6/2002 | Iino et al. |
| 6,576,830 | B2 | 6/2003 | Nagao et al. |
| 6,928,781 | B2 | 8/2005 | Desbois et al. |
| 6,972,367 | B2 | 12/2005 | Federspiel et al. |
| 7,138,578 | B2 | 11/2006 | Komamine |
| 7,155,870 | B2 | 1/2007 | Almy |
| 7,178,295 | B2 | 2/2007 | Dinwoodie |
| 7,487,771 | B1 | 2/2009 | Eiffert et al. |
| 7,587,864 | B2 | 9/2009 | McCaskill |
| 7,678,990 | B2 | 3/2010 | McCaskill et al. |
| 7,678,991 | B2 | 3/2010 | McCaskill et al. |
| 7,748,191 | B2 | 7/2010 | Podirsky |
| 7,819,114 | B2 | 10/2010 | Augenbraun et al. |
| 7,824,191 | B1 | 11/2010 | Podirsky |
| 7,832,176 | B2 | 11/2010 | McCaskill et al. |
| 8,118,109 | B1 | 2/2012 | Hacker |
| 8,168,880 | B2 | 5/2012 | Jacobs et al. |
| 8,173,889 | B2 | 5/2012 | Kalkanoglu et al. |
| 8,210,570 | B1 | 7/2012 | Railkar et al. |
| 8,276,329 | B2 | 10/2012 | Lenox |
| 8,312,693 | B2 | 11/2012 | Cappelli |
| 8,319,093 | B2 | 11/2012 | Kalkanoglu et al. |
| 8,333,040 | B2 | 12/2012 | Shiao et al. |
| 8,371,076 | B2 | 2/2013 | Jones et al. |
| 8,375,653 | B2 | 2/2013 | Shiao et al. |
| 8,404,967 | B2 | 3/2013 | Kalkanoglu et al. |
| 8,410,349 | B2 | 4/2013 | Kalkanoglu et al. |
| 8,418,415 | B2 | 4/2013 | Shiao et al. |
| 8,438,796 | B2 | 5/2013 | Shiao et al. |
| 8,468,754 | B2 | 6/2013 | Railkar et al. |
| 8,468,757 | B2 | 6/2013 | Krause et al. |
| 8,505,249 | B2 | 8/2013 | Geary |
| 8,512,866 | B2 | 8/2013 | Taylor |
| 8,513,517 | B2 | 8/2013 | Kalkanoglu et al. |
| 8,586,856 | B2 | 11/2013 | Kalkanoglu et al. |
| 8,601,754 | B2 | 12/2013 | Jenkins et al. |
| 8,629,578 | B2 | 1/2014 | Kurs et al. |
| 8,646,228 | B2 | 2/2014 | Jenkins |
| 8,656,657 | B2 | 2/2014 | Livsey et al. |
| 8,671,630 | B2 | 3/2014 | Lena et al. |
| 8,677,702 | B2 | 3/2014 | Jenkins |
| 8,695,289 | B2 | 4/2014 | Koch et al. |
| 8,713,858 | B1 | 5/2014 | Xie |
| 8,713,860 | B2 | 5/2014 | Railkar et al. |
| 8,733,038 | B2 | 5/2014 | Kalkanoglu et al. |
| 8,776,455 | B2 | 7/2014 | Azoulay |
| 8,789,321 | B2 | 7/2014 | Ishida |
| 8,793,940 | B2 | 8/2014 | Kalkanoglu et al. |
| 8,793,941 | B2 | 8/2014 | Bosler et al. |
| 8,826,607 | B2 | 9/2014 | Shiao et al. |
| 8,835,751 | B2 | 9/2014 | Kalkanoglu et al. |
| 8,863,451 | B2 | 10/2014 | Jenkins et al. |
| 8,898,970 | B2 | 12/2014 | Jenkins et al. |
| 8,925,262 | B2 | 1/2015 | Railkar et al. |
| 8,943,766 | B2 | 2/2015 | Gombarick et al. |
| 8,946,544 | B2 | 2/2015 | Jabos et al. |
| 8,950,128 | B2 | 2/2015 | Kalkanoglu et al. |
| 8,959,848 | B2 | 2/2015 | Jenkins et al. |
| 8,966,838 | B2 | 3/2015 | Jenkins |
| 8,966,850 | B2 | 3/2015 | Jenkins et al. |
| 8,994,224 | B2 | 3/2015 | Mehta et al. |
| 9,032,672 | B2 | 5/2015 | Livsey et al. |
| 9,153,950 | B2 | 10/2015 | Yamanaka et al. |
| 9,166,087 | B2 | 10/2015 | Chihlas et al. |
| 9,169,646 | B2 | 10/2015 | Rodrigues et al. |
| 9,170,034 | B2 | 10/2015 | Bosler et al. |
| 9,178,465 | B2 | 11/2015 | Shiao et al. |
| 9,202,955 | B2 | 12/2015 | Livsey et al. |
| 9,212,832 | B2 | 12/2015 | Jenkins |
| 9,217,584 | B2 | 12/2015 | Kalkanoglu et al. |
| 9,270,221 | B2 | 2/2016 | Zhao |
| 9,273,885 | B2 | 3/2016 | Rordigues et al. |
| 9,276,141 | B2 | 3/2016 | Kalkanoglu et al. |
| 9,331,224 | B2 | 5/2016 | Koch et al. |
| 9,356,174 | B2 | 5/2016 | Duarte et al. |
| 9,359,014 | B1 | 6/2016 | Yang et al. |
| 9,412,890 | B1 | 8/2016 | Meyers |
| 9,528,270 | B2 | 12/2016 | Jenkins et al. |
| 9,605,432 | B1 | 3/2017 | Robbins |
| 9,711,672 | B2 | 7/2017 | Wang |
| 9,755,573 | B2 | 9/2017 | Livsey et al. |
| 9,786,802 | B2 | 10/2017 | Shiao et al. |
| 9,831,818 | B2 | 11/2017 | West |
| 9,912,284 | B2 | 3/2018 | Svec |
| 9,923,515 | B2 | 3/2018 | Rodrigues et al. |
| 9,938,729 | B2 | 4/2018 | Coon |
| 9,991,412 | B2 | 6/2018 | Gonzalez et al. |
| 9,998,067 | B2 | 6/2018 | Kalkanoglu et al. |
| 10,027,273 | B2 | 7/2018 | West et al. |
| 10,115,850 | B2 | 10/2018 | Rodrigues et al. |
| 10,128,660 | B1 | 11/2018 | Apte et al. |
| 10,156,075 | B1 | 12/2018 | McDonough |
| 10,187,005 | B2 | 1/2019 | Rodrigues et al. |
| 10,256,765 | B2 | 4/2019 | Rodrigues et al. |
| 10,284,136 | B1 | 5/2019 | Mayfield et al. |
| 10,454,408 | B2 | 10/2019 | Livsey et al. |
| 10,530,292 | B1 | 1/2020 | Cropper et al. |
| 10,560,048 | B2 | 2/2020 | Fisher et al. |
| 10,563,406 | B2 | 2/2020 | Kalkanoglu et al. |
| D879,031 | S | 3/2020 | Lance et al. |
| 10,579,028 | B1 | 3/2020 | Jacob |
| 10,784,813 | B2 | 9/2020 | Kalkanoglu et al. |
| D904,289 | S | 12/2020 | Lance et al. |
| 11,012,026 | B2 | 5/2021 | Kalkanoglu et al. |
| 11,177,639 | B1 | 11/2021 | Nguyen et al. |
| 11,217,715 | B2 | 1/2022 | Sharenko |
| 11,251,744 | B1 | 2/2022 | Bunea |
| 11,258,399 | B2 | 2/2022 | Kalkanoglu et al. |
| 11,283,394 | B2 | 3/2022 | Perkins et al. |
| 11,309,828 | B2 | 4/2022 | Sirski et al. |
| 11,394,344 | B2 | 7/2022 | Perkins et al. |
| 11,424,379 | B2 | 8/2022 | Sharenko et al. |

(56) References Cited

U.S. PATENT DOCUMENTS

| | | |
|---|---|---|
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placerl. et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1* | 1/2009 | Croft ............... H02S 50/00 136/246 |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1* | 12/2010 | Degenfelder ............ E04D 1/30 52/173.3 |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0042463 A1* | 2/2016 | Gillespie ............... G06Q 40/08 705/4 |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |

(56) References Cited

U.S. PATENT DOCUMENTS

| | | | |
|---|---|---|---|
| 2021/0083619 A1 | 3/2021 | Hegedus | |
| 2021/0115223 A1 | 4/2021 | Bonekamp et al. | |
| 2021/0159353 A1 | 5/2021 | Li et al. | |
| 2021/0301536 A1 | 9/2021 | Baggs et al. | |
| 2021/0343886 A1 | 11/2021 | Sharenko et al. | |
| 2022/0149213 A1 | 5/2022 | Mensink et al. | |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2010/151777 A2 | 12/2020 |
| WO | 2021-247098 A1 | 12/2021 |

OTHER PUBLICATIONS

RGS Energy, 3.5kW POWERHOUSE 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

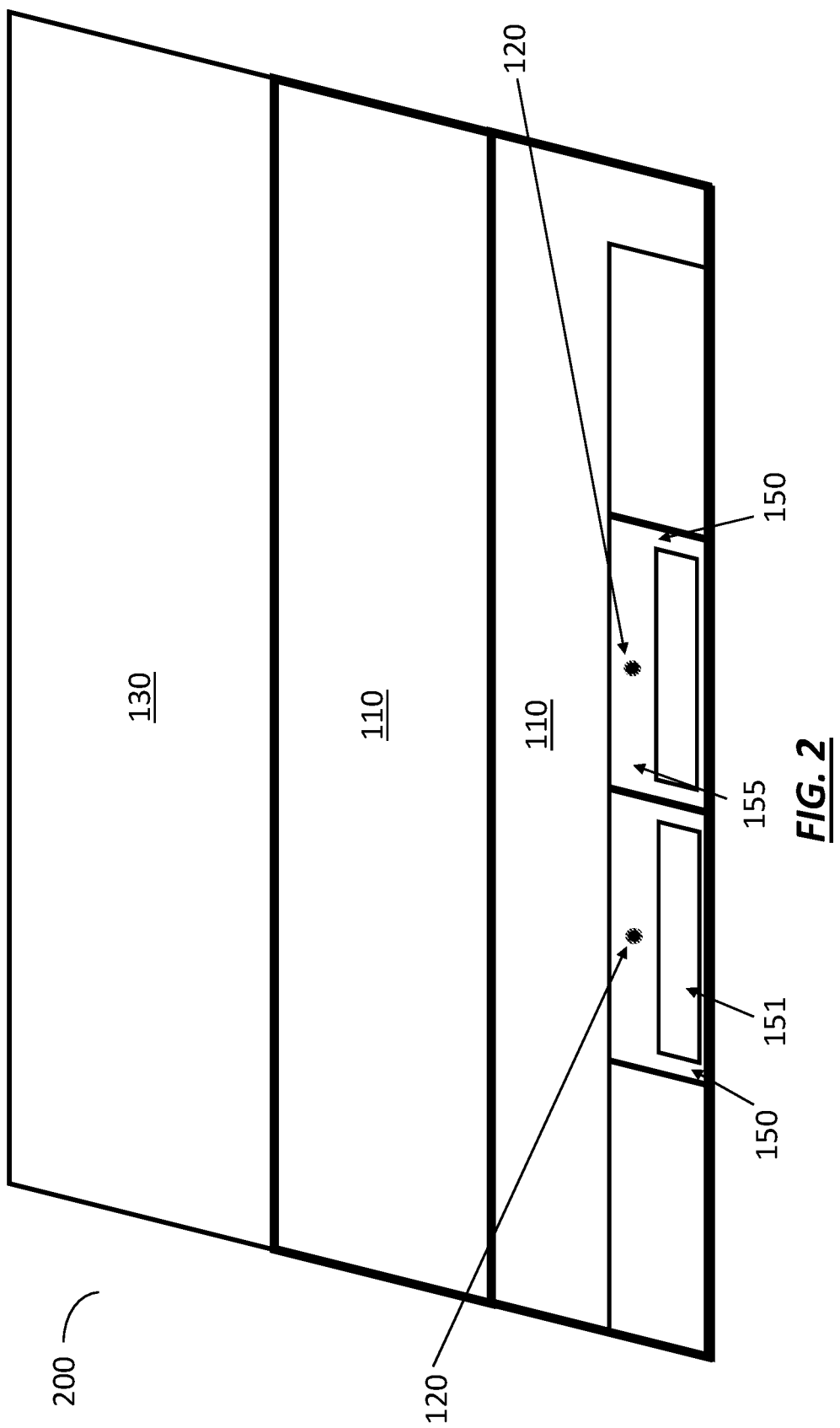

SENSING ROOFING SYSTEM AND METHOD THEREOF

CROSS-REFERENCE TO RELATED APPLICATION

This application claims the benefit of priority of U.S. provisional application Ser. No. 63/406,104, filed Sep. 13, 2022, titled "Sensing roof System and Method Thereof," the disclosure of which is incorporated by reference herein in its entirety.

FIELD OF THE INVENTION

The disclosure generally relates to a roofing system and method, and, more particularly, the disclosure relates to a roofing system and method that provides automatic sensing of a roof condition and subsequent notification of the roof condition.

BACKGROUND

A building owner or occupant may desire to measure various conditions of a roof, to determine whether there is a potential problem with the roof which may result in damage to the roof and/or to the structure covered by the roof. Although a technician may be skilled at evaluating the conditions on a roof, a technician may err. Further, a technician may find it difficult or impossible to identify certain roof conditions in inaccessible locations, such as, for example, between a roofing shingle and an underlayment, or between the underlayment and a roof deck.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the disclosure provides a method comprising: obtaining a flexible underlayment, wherein the flexible underlayment comprises: a first sensor, wherein the first sensor comprises a first flexible circuit, and wherein the first flexible circuit is configured to: measure a first value representative of a first roofing system condition measurement, wherein the first flexible circuit measures the first value at a first location, wherein a first location identifier indicative of the first location is stored in a database in communication with the first sensor; determine a first roofing system condition in the first location based at least in part on the first value and the first location identifier; and generate a first notification representative of the first roofing system condition in the first location; and a second sensor, wherein the second sensor comprises a second flexible circuit, and wherein the second flexible circuit is configured to: measure a second value representative of a second roofing system condition measurement, wherein the second flexible circuit measures the second value at a second location, wherein the second location is a different location that the first location, wherein a second location identifier indicative of the second location is stored in the database in communication with the second sensor; determine a second roofing system condition in the second location based at least in part on the second value and the second location identifier; and generate a second notification representative of the second roofing system condition in the second location; installing the flexible underlayment on a roof deck of a steep slope roof of a structure; installing a first roofing shingle over the flexible underlayment with first fasteners, wherein the first roofing shingle is disposed above at least the first sensor; and installing a second roofing shingle over the flexible underlayment with second fasteners, wherein the second roofing shingle is disposed above at least the second sensor.

In some embodiments, either or both of the first roofing shingle and/or the second roofing shingle comprises thermoplastic olefin. In some embodiments, either or both of the first roofing shingle and/or the second roofing shingle comprises polyvinyl chloride. In some embodiments, either or both of the first roofing shingle and/or the second roofing shingle comprises asphalt. In some embodiments, either or both of the first roofing shingle and/or the second roofing shingle comprises a fiber-reinforced asphalt material. In some embodiments, either or both of the first roofing shingle and/or the second roofing shingle comprises embedded granules. In some embodiments, either or both of the first roofing shingle and/or the second roofing shingle comprises photovoltaic roofing shingles.

In some embodiments, installing the first roofing shingle over the flexible underlayment with the first fasteners comprises installing the first roofing shingle without penetrating the first sensor with the first fasteners.

In some embodiments, the flexible underlayment comprises at least one of: a fiberglass material, a fiberglass-reinforced material, or a polypropylene material.

In some embodiments, the first and second sensors are disposed on a surface of the flexible underlayment.

In some embodiments, the first and second sensors are printed onto the flexible underlayment.

In some embodiments, the first and second sensors are disposed within an interior of the flexible underlayment.

In some embodiments, each of the first and second sensors comprises at least one of: a moisture sensor, a temperature sensor, a strain sensor, a thermal sensor, a ground fault sensor, an integrated flex-circuit antenna array, an air quality sensor, or a temperature sensitive bimetal.

In some embodiments, the first fasteners comprises at least one of: nails, rivets, staples, screws, and adhesive.

In some embodiments, the disclosure provides a system comprising: a roof deck of a steep slope roof of a structure; a flexible underlayment, wherein the flexible underlayment comprises: a first sensor, wherein the first sensor comprises a first flexible circuit, and wherein the first flexible circuit is configured to: measure a first value representative of a first roofing system condition measurement, wherein the first flexible circuit measures the first value at a first location, wherein a first location identifier indicative of the first location is stored in a database in communication with the first sensor; determine a first roofing system condition in the first location based at least in part on the first value and the first location identifier; and generate a first notification representative of the first roofing system condition in the first location; and a second sensor, wherein the second sensor comprises a second flexible circuit, and wherein the second flexible circuit is configured to: measure a second value representative of a second roofing system condition measurement, wherein the second flexible circuit measures the second value at a second location, wherein the second location is a different location that the first location, wherein a second location identifier indicative of the second location is stored in the database in communication with the second sensor; determine a second roofing system condition in the second location based at least in part on the second value and the second location identifier; and generate a second notification representative of the second roofing system condition in the second location; wherein the flexible underlayment is located on the roof deck; a first roofing shingle installed over the flexible underlayment with first fasteners, wherein the first roofing shingle is disposed above at least the first sensor; and a second roofing shingle installed over the flexible underlayment with second fasteners, wherein the second roofing shingle is disposed above at least the second sensor.

In some embodiments, the disclosure provide a method comprising: obtaining a photovoltaic module, wherein the photovoltaic module comprises: a first layer comprising a solar cell, a backing layer under the first layer, and at least one sensor located in the backing layer; wherein the at least one sensor is configured to: measure at least one value representative of at least one roofing system condition measurement; wherein the at least one sensor measures the at least one value in a location associated with the photovoltaic module; wherein a location identifier for the location is stored in a database in communication with the at least one sensor; determine a roofing system condition in the location based at least in part on the at least one value and the location identifier; and generate at least one notification representative of the roofing system condition in the at least one location; and installing the photovoltaic module on a roof deck of a steep sloped roof of a structure with first fasteners.

In some embodiments, the plurality of sensors are disposed on a surface of the backing layer, between the backing layer and the roof deck.

In some embodiments, the plurality of sensors are embedded within the backing layer.

In some embodiments, the plurality of sensors are printed onto the backing layer.

In some embodiments, the disclosure provides a system comprising: a roof deck of a steep sloped roof of a structure; a photovoltaic module installed on the steep sloped roof with first fasteners, wherein the photovoltaic module comprises: a first layer comprising a solar cell, a backing layer under the first layer, and at least one sensor located in the backing layer; wherein the at least one sensor is configured to: measure at least one value representative of at least one roofing system condition measurement; wherein the at least one sensor measures the at least one value in a location associated with the photovoltaic module; wherein a location identifier for the location is stored in a database in communication with the at least one sensor; determine a roofing system condition in the location based at least in part on the at least one value and the location identifier; and generate at least one notification representative of the roofing system condition in the at least one location.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is an isometric view of a sensing roof system in accordance with some embodiments of the invention.

DETAILED DESCRIPTION

Figure 1:
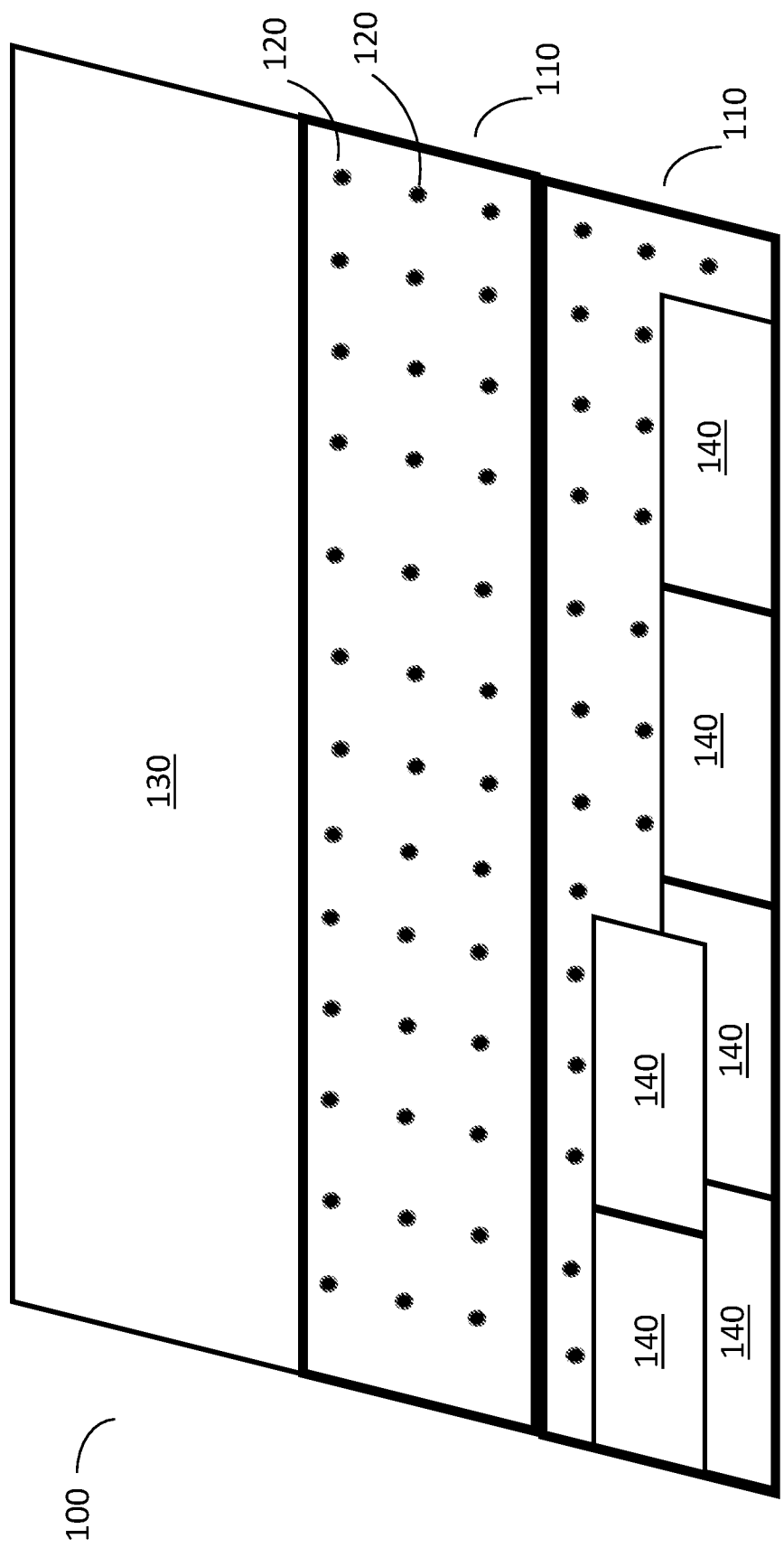
FIG. 1 is an isometric view of a sensing roof system in accordance with some embodiments of the invention.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or," or with the conjunction "and." In either case, the set is to be interpreted as meaning each of the items singularly as alternatives, as well as any combination of the listed items.

The invention is now described with reference to the figures. FIG. 1 is an isometric view of a sensing roof system in accordance with some embodiments of the invention. As shown in FIG. 1, a sensing roof system 100 may include an underlayment 110 with one or more sensors 120. In some embodiments, the sensing roof system 100 may include the underlayment 110 installed on a roof deck 130. In some embodiments, the sensing roof system 100 may include one or more roofing shingles 140 installed on the underlayment 110 and the roof deck 130. The figure shows a partially-roofed roof deck 130—that is, the roof deck 130 that is not fully covered with roofing shingles 140. Although not shown in the figure, the sensing roof system 100 may include the roof deck 130 covered fully by the underlayment 110, and the underlayment 110 covered fully by the roofing shingles 140.

In some embodiments, components of the sensing roof system 100, such as but not limited to the underlayment 110, the sensors 120, and the roofing shingles 140, may be installed on the roof deck 130 of a steep slope roof of a structure. As used herein, a "steep slope" roof deck is a roof deck that is disposed on a roof having a pitch of Y/X, where Y and X are in a ratio of 4:12 to 20:12, where Y corresponds to the "rise" of the roof, and where X corresponds to the "run" of the roof. In some embodiments, one or more fasteners, such as an adhesive, and/or such as a plurality of penetrating fasteners including but not limited to one or more of screws, staples, nails, and/or rivets, may be used to install the underlayment 110 onto the roof deck 130.

In some embodiments, the roof deck 130 may be a sloped roof of a structure. As used herein, a "sloped" roof deck is a roof deck that has a slope less than a slope of a steep slope roof deck, but is not a flat roof deck.

In some embodiments, the underlayment 110 may be a single layer. In some embodiments, the underlayment 110 may include multiple layers. In some embodiments, regardless of whether the underlayment 110 is a single layer or multiple layers, the underlayment 110 may be flexible. As used herein, the term "flexible" means bendable without breaking and/or without resulting in plastic or other permanent deformation, and with respect to certain embodiments of the underlayment 110, the underlayment 110 is bendable without breakage and/or without resulting in plastic or other permanent deformation of any layer or layers.

In some embodiments, the sensors 120 may be installed in and/or on the underlayment 110. In some embodiments, the sensors 120 may be installed on a side or surface of the underlayment 110. In some embodiments, regardless of whether the underlayment 110 is a single layer or multiple layers, the sensors 120 may be installed on a top or topmost side or surface of the underlayment 110 (that is, on a side of the underlayment 110 which is opposite the roof deck 130). In some embodiments, regardless of whether the underlayment 110 is a single layer or multiple layers, the sensors 120 may be installed on a bottom or bottommost side or surface of the underlayment 110 (that is, on a side of the underlayment 110 which is adjacent to the roof deck 130). In some embodiments, the sensors 120 may be adhered to or otherwise installed on one surface or both surfaces of the underlayment 110 using an adhesive. In some embodiments, the sensors 120 may be printed on one surface or both surfaces of the underlayment 110. In some embodiments, the sensors 120 may be printed on the underlayment 110 during manufacturing of the underlayment 110. In some embodiments, when the underlayment 110 is multiple layers, the sensors 120 may be disposed between layers of the underlayment 110. In some embodiments, regardless of whether the underlayment 110 is a single layer or multiple layers, the sensors 120 may be installed within an interior of (e.g., embedded at least partially or fully within) one or more of the layers of the underlayment 110.

In some embodiments, the sensors 120 may include a power source. In some embodiments, the power source may be a battery. In some embodiments, the sensors 120 may include one or more components that receive wireless energy transmission. In some embodiments, the one or more components may include components to receive non-radiative (that is, near-field) power. In some embodiments, the components to receive near-field power may include components configured to receive power based on a magnetic fields, such as for example components configured to receive power based on inductive coupling. In some embodiments, the one or more components that receive wireless energy may include components to receive radiative (that is, non-near-field or far-field) power.

In some embodiments, the underlayment 110 may be a fiberglass material. In some embodiments, the underlayment 110 may be a fiberglass-reinforced material. In some embodiments, the underlayment 110 may be a polypropylene material.

In some embodiments, the underlayment 110 may be provided on a roll. In some embodiments, the roll of underlayment 110 may be 5 feet in width. In some embodiments, the roll of underlayment 110 may be 10 feet in width. In some embodiments, the roll of underlayment 110 may be 50 feet in length. In some embodiments, the roll of underlayment 110 may be 100 feet in length. In some embodiments, the underlayment 110 may be provided as a sheet. In some embodiments, one section or piece of underlayment 110, whether provided as a roll or a sheet, may be used to cover an entirety of the roof deck 130. In some embodiments, multiple sections or pieces of underlayment 110, whether provided as a roll or a sheet, may be used cover the roof deck 130.

In some embodiments, one or more of the sensors 120 includes circuits configured to determine one or more roofing conditions, as further described below. In some embodiments, the sensors 120 may be a flexible sensors and/or may include flexible circuits. As used herein, the term "flexible" means capable of bending without breaking and without plastic or other permanent deformation, and with respect to certain embodiments of the sensors 120 and their circuits, the sensors 120 and/or their circuits may bend without breakage and/or without resulting in plastic or other permanent deformation of any of the components of the sensors 120 and/or the circuits.

In some embodiments, one or more of the sensors 120, through their respective circuits, are configured to measure one or more values that are representative of one or more roofing system conditions. In some embodiments, the sensor 120 may measure multiple values that are representative of multiple roofing system conditions. In some embodiments, the sensor 120 may measure only a single value that is representative of a single roofing system condition. In some embodiments, the sensor 120 may measure only multiple values that are representative of a single roofing system condition. In some embodiments, the sensor 120 may be configured to measure the value or values at the location of the sensor 120. In some embodiments, the sensor 120 may be configured to measure the value or values at a location that is near, but apart from, the location of the sensor 120.

In some embodiments, each of the sensors 120 may transmit and/or receive a location identifier. In some embodiments, each location identifier may identify an absolute location of the sensor 120 on the roof deck 130. In some embodiments, each location identifier may identify the relative location of the sensor 120 to one or more other sensors 120, on the roof deck 130. In some embodiments, the transmission and/or reception may be wireless. In some embodiments, the wireless transmission and/or reception may be WiFi. In some embodiments, the wireless transmission and/or reception may be BlueTooth. In some embodiments, the wireless transmission and/or reception may be radio waves. In some embodiments, the transmission and/or reception may be wired.

In some embodiments, a computer database may store the location identifier associated with each of the sensors 120. In some embodiments, the computer database may be in communication with each of the sensors 120, and may transmit and/or receive location identified information and/or roofing system condition information, as described. In this way, because the sensing roof system 100 stores the locations of the sensors 120, the sensing roof system 100 may determine the roofing system condition at known locations on the roof deck 130. In some embodiments, the sensing roof system 100 may determine the roofing system condition at specific locations on the roof deck 130 based at least in part on the measured value and the location identifier. In some embodiments, the sensing roof system 100 may generate a notification representative of the roofing system condition in the location of the sensor. In some embodiments, the sensors 120 may generate the notification representative of the roofing system condition in the location of the sensor 120. In some embodiments, a receiver may receive the notification representative of the roofing system condition in the location of the sensor 120. In some embodiments, the receiver may be a handheld receiver. In some embodiments, the receiver may be installed in the structure. In some embodiments, the receiver may be installed permanently in the structure.

As shown in FIG. 1, the sensing roof system 100 may include one or more roofing shingles 140. In some embodiments, multiple roofing shingles 140 may cover multiple sensors 120. In some embodiments, one roofing shingle 140 may cover multiple sensors 120. In some embodiments, one roofing shingle 140 may cover one of the sensors 120. In some embodiments, only some of the roofing shingles 140 may cover one or more sensors 120. In some embodiments, some of the roofing shingles 140 may not cover any of the sensors 120. In some embodiments, the sensors 120 may determine the roofing system conditions underneath the roofing shingles 140. When the underlayment 110 with the sensors 120 covers an entire roof, and the roofing shingles 140 cover the entire roof and the entirety of the underlayment 110, the sensors 120 may determine the roofing system conditions for the entire roof underneath the roofing shingles 140.

As shown in FIG. 1, one or more fasteners may install the roofing shingles 140 on the roof deck 130. In some embodiments, the fasteners may be an adhesive. In some embodiments, the fasteners may be penetrating fasteners. In some embodiments, the penetrating fasteners may include a plurality of nails. In some embodiments, the penetrating fasteners may include a plurality of rivets. In some embodiments, the penetrating fasteners may include a plurality of staples. In some embodiments, the penetrating fasteners may include a plurality of screws.

In some embodiments, although the fasteners penetrates the roofing shingles 140, the underlayment 110, and the roof deck 130, thereby to install the roofing shingles 140 on the roof deck 130, the fasteners may not penetrate any of the sensors 120. This is because, in some embodiments, the underlayment 110 may include markings or other notations indicating the locations of the sensors 120, so that the fasteners may be placed outside of the areas indicated by the markings or notations. In some embodiments, the underlayment 110 may include markings or other notations indicating areas in which placement of the fasteners will not result in any penetration of any of the sensors 120 (e.g., the underlayment 110 may include indications of where fasteners may be placed). In some embodiments, the underlayment 110 may include markings or other notations indicating placement of the roofing shingles on the underlayment 110, and the sensors 120 may be located in or on the underlayment 110, so that installation of the roofing shingles 140 in accordance with the markings or notations will not result in the fasteners penetrating any of the sensors 120 (e.g., the underlayment 110 may include indications of where fasteners should not be placed).

In some embodiments, the roofing shingles 140 may be an asphalt material. In some embodiments, the roofing shingles 140 may be a fiber-reinforced asphalt material. In some embodiments, the roofing shingles 140 may be a fiberglass material. In some embodiments, the roofing shingles 140 may be thermoplastic olefin. In some embodiments, the roofing shingles 140 may be polyvinyl chloride. In some embodiments, the roofing shingles 140 may include granules on a top surface thereof, such as embedded granules. In some embodiments, as shown in the figure, the roofing shingles 140 may be non-photovoltaic roofing shingles or modules (e.g., roofing shingles or modules that do not include an active solar cell).

In some embodiments, the roofing shingle is a cuttable roofing module. In some embodiments, the roofing shingle is a nailable roofing module. In some embodiments, the roofing shingle is a cuttable roofing module shown and described in U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023, the disclosures of each of which are incorporated by reference herein in their entireties.

FIG. 2 is an isometric view of a sensing roof system in accordance with some embodiments of the invention. In FIG. 2, the sensing roof system 200 include the one or more sensors 120 associated with photovoltaic modules 150, which are installed on the roof deck 130. As shown in FIG. 2, in some embodiments, the sensing roof system 200 may include the underlayment 110. The underlayment may or may not include the sensors 120. In some embodiments, the sensing roof system 200 may omit the underlayment 110 entirely.

FIG. 2 shows a partially-roofed roof deck 130. Although not shown in the figure, the sensing roof system 200 may include the roof deck 130 covered fully by the underlayment 110, and the underlayment 110 covered fully by the photovoltaic modules 150.

As shown in FIG. 2, in some embodiments, each of the photovoltaic modules 150 may include a first layer 151. In some embodiments, the first layer 151 may include one or more solar cells. In some embodiments, the solar cells may be used to convert light into electricity, such that the first layers 151 are electrically active portions. In some embodiments, the solar cell or solar cells in the first layers 151 may not be used to convert light into electricity, such that the first layers 151 are electrically inactive portions.

In some embodiments, in each of the photovoltaic modules 150, the first layer 151 is disposed above a backing layer 155—that is, the backing layer 155 may be located below the first layer 151. In some embodiments, the first layer 151 may be located directly on the backing layer 155—that is, there may be no intervening layer between the backing layer 155 and the first layer 151. In some embodiments, the first layer 151 may not be located directly on the backing layer 155—that is, there may be one or more intervening layers between the backing layer 155 and the first layer 151.

As shown in FIG. 2, for each of the photovoltaic modules 150, one or more of the sensors 120 may be associated with the backing layers 155 of the photovoltaic modules 150. In some embodiments, the sensors 120 may be located in (e.g., at least partially or fully embedded within an interior of) the backing layer 155. In some embodiments, the sensors 120 may be located on a surface of the backing layer 155. In some embodiments, the sensors 120 may be installed on a bottom or bottommost side or surface of the backing layer 155 (that is, on a side of the backing layer 155 which is adjacent or closest to the underlayment 110 and the roof deck 130). In some embodiments, the sensors 120 may be adhered to the surface with an adhesive. In some embodiments, the sensors 120 may be printed on the surface of the backing layer 155. In some embodiments, the sensors 120 may be printed on the backing layer 155 during manufacturing of the photovoltaic modules 150. In some embodiments, the sensors 120 may be associated with the first layers 151 of the photovoltaic modules 150. In some embodiments, the sensors 120 may be disposed within or on the first layers 151 of the photovoltaic modules 150. In some embodiments, the sensors 120 may be associated with other portions of the photovoltaic modules 150.

In some embodiments, each or some of the sensors 120 may be a moisture sensor. In some embodiments, the moisture sensor may sense an absolute or a relative humidity of the environment. In some embodiments, the moisture sensor may include a circuit that senses a change in resistance. In some embodiments, the change in resistance may indicate moisture. In some embodiments, the circuit may be a printed circuit.

In some embodiments, each or some of the sensors 120 may be a temperature sensor. In some embodiments, the temperature sensor may include a temperature sensitive bimetal. In some embodiments, the temperature sensor may include a circuit that senses a change in resistance. In some embodiments, the change in resistance may indicate a temperature. In some embodiments, the circuit may be a printed circuit. In some embodiments, the temperature sensor may include a thermocouple. In some embodiments, the temperature sensor may sense the temperature of one or more the roof deck 130, the underlayment 110, one or more of the roofing shingles 140, and/or one or more of the photovoltaic modules 150. In some embodiments, the temperature sensor may sense the temperature of one or more surfaces of the roof deck 130, the underlayment 110, one or more of the roofing shingles 140, and/or one or more of the photovoltaic modules 150. In some embodiments, the temperature sensor may indicate a fire.

In some embodiments, each or some of the sensors 120 may be a strain sensor. In some embodiments, the strain sensor may sense the strain on one or more of the roof deck 130, the underlayment 110, one or more of the roofing shingles 140, and/or one or more of the photovoltaic modules 150. In some embodiments, the strain sensor may sense the strain on one or more solar cells of a photovoltaic module. In some embodiments, the strain sensor may include a circuit that senses a change in resistance. In some embodiments, the change in resistance may indicate a strain. In some embodiments, the circuit may be a printed circuit.

In some embodiments, each or some of the sensors 120 may be a thermal sensor. In some embodiments, the thermal sensor may sense a heat gradient of one or more of the roof deck 130, the underlayment 110, one or more of the roofing shingles 140, one or more of the photovoltaic modules 150, and/or the one or more solar cells of a photovoltaic module 150.

In some embodiments, each or some of the sensors 120 may be a ground fault sensor. In some embodiments, the ground fault sensor may sense a fault in one or more of the photovoltaic modules 150, and/or the one or more solar cells of a photovoltaic module 150. In some embodiments, the fault may be one or more of an electrical short, an electric arc, and/or an electrical hotspot.

In some embodiments, each or some of the sensors 120 may be an air quality sensor. In some embodiments, the air quality sensor may sense the quality of the air at and/or adjacent to one or more of the roof deck 130, the underlayment 110, one or more of the roofing shingles 140, one or more of the photovoltaic modules 150.

In some embodiments, each or some of the sensors 120 may be an integrated flex-circuit antenna array. In some embodiments, the integrated flex-circuit antenna array may sense or act as an antenna for wireless transmission of voice, sound, data, and/or energy.

In some embodiments, the type or types of sensors 120 in or on the underlayment 110 may correspond to the type or types of roofing shingles 140 and/or photovoltaic modules 150 included in the sensing roof system. In some embodiments, the types of sensors 120 in or on the underlayment 110 may correspond to one or more roofing conditions that are desired to be measured or monitored. In some embodiments, one or more of the above-described sensors may be an RFID tag.

In some embodiments, one or more of the photovoltaic modules 150 is a photovoltaic module shown and described in either or both of U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023, the disclosures of each of which are incorporated by reference herein in their entireties. In some embodiments, the photovoltaic module includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

It is to be understood that components described throughout the description, and components shown in the various figures, may be combined with each other, to cover a roof deck in various ways. For example, in some embodiments, the sensing roof system may include sensors 120 associated with (that is, in or on) both the photovoltaic modules 150 as well as the underlayment 110. In some embodiments, the sensing roof system may include sensors 120 associated with (that is, in or on) the underlayment 110 under photovoltaic roofing shingles. In some embodiments, the sensing roof system may include sensors 120 associated with (that is, in or on) the underlayment 110 regardless of what is above the underlayment 110. In some embodiments, a roofing system may include one or more roofing shingles 140 with or without sensors 120; one or more photovoltaic modules 150 with or without sensors; and/or underlayment 110 with or without sensors 120.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein.

The invention claimed is:

1. A system, comprising:
   a roof deck of a steep slope roof of a structure;
   a flexible underlayment installed on the roof deck,
      wherein the flexible underlayment comprises:
         a first layer,
         a first sensor integral with the first layer,
            wherein the first sensor comprises a first flexible circuit, and
            wherein the first flexible circuit is configured to:
               measure a first value representative of a first roofing system condition,
               wherein the first flexible circuit measures the first value at a first location,
               wherein a first location identifier indicative of the first location is stored in a database in communication with the first sensor,
               determine the first roofing system condition in the first location based at least in part on the first value and the first location identifier, and
               generate a first notification representative of the first roofing system condition in the first location; and
         a second sensor integral with the first layer,
            wherein the second sensor comprises a second flexible circuit, and
            wherein the second flexible circuit is configured to:
               measure a second value representative of a second roofing system condition,
               wherein the second flexible circuit measures the second value at a second location,
               wherein the second location is different from the first location,
               wherein a second location identifier indicative of the second location is stored in the database in communication with the second sensor,
               determine the second roofing system condition in the second location based at least in part on the second value and the second location identifier, and
               generate a second notification representative of the second roofing system condition in the second location;
   a first roofing shingle installed on the flexible underlayment,
      wherein the first roofing shingle is disposed above at least the first sensor; and
   a second roofing shingle installed on the flexible underlayment,
      wherein the second roofing shingle is disposed above at least the second sensor,
      wherein at least one of the first roofing shingle and the second roofing shingle comprises a photovoltaic module.

2. The system of claim 1, wherein the first roofing shingle is installed on the flexible underlayment with first fasteners,
   wherein the second roofing shingle is installed on the flexible underlayment with second fasteners,
      wherein the first and second fasteners do not penetrate either of the first sensor and the second sensor.

3. The system of claim 1, wherein the flexible underlayment comprises at least one of:
   a fiberglass material,
   a fiberglass-reinforced material, or
   a polypropylene material.

4. The system of claim 1, wherein the first and second sensors are disposed on a surface of the flexible underlayment.

5. The system of claim 1, wherein the first sensor comprises a first printed sensor on a surface the flexible underlayment, and
   wherein the second sensor comprises a second printed sensor on the surface.

6. The system of claim 1, wherein the first and second sensors are disposed within an interior of the flexible underlayment.

7. The system of claim 1, wherein each of the first and second sensors comprises at least one of:
   a moisture sensor,
   a temperature sensor,
   a strain sensor,
   a thermal sensor,
   a ground fault sensor,
   an integrated flex-circuit antenna array, or
   an air quality sensor.

8. The system of claim 2, wherein the first fasteners comprises at least one of: nails, rivets, staples, screws, and adhesive.

9. The system of claim 1, wherein each of the first roofing shingle and the second roofing shingle comprises a photovoltaic module.

10. The system of claim 1, wherein the first roofing shingle comprises a photovoltaic module, and the second roofing shingle comprises a non-photovoltaic module.

11. The system of claim 1, wherein the flexible underlayment further comprises:
    a first indication on a surface of the flexible underlayment,
       wherein the first indication indicates either:
          the first location of the first sensor, or
          a first fastener area adjacent the first location and configured to receive a first fastener without penetrating the first sensor; and
    a second indication on the surface,
       wherein the second indication indicates either:
          the second location of the second sensor, or
          a second fastener area adjacent the second location and configured to
          receive a second fastener without penetrating the second sensor.

12. The system of claim 11, wherein the first indication comprises a first printed marking on a surface of the flexible underlayment.

13. The system of claim 1, further comprising:
    a first fastener,
       wherein the first fastener penetrates the first roofing shingle, the flexible underlayment, and the roof deck without penetrating the first sensor and without penetrating the second sensor.

* * * * *